US007789596B2

(12) United States Patent
Fellinger

(10) Patent No.: US 7,789,596 B2
(45) Date of Patent: Sep. 7, 2010

(54) SYSTEM AND METHOD FOR FORMING AN INSULATION PARTICLE/AIR SUSPENSION

(75) Inventor: Thomas J. Fellinger, Littleton, CO (US)

(73) Assignee: Johns Manville, Denver, CO (US)

( * ) Notice: Subject to any disclaimer, the term of this patent is extended or adjusted under 35 U.S.C. 154(b) by 563 days.

(21) Appl. No.: 11/509,400

(22) Filed: Aug. 24, 2006

(65) Prior Publication Data

US 2007/0014641 A1 Jan. 18, 2007

Related U.S. Application Data

(63) Continuation of application No. PCT/US2005/008813, filed on Mar. 16, 2005.

(60) Provisional application No. 60/554,176, filed on Mar. 18, 2004.

(51) Int. Cl.
*B65G 53/00* (2006.01)

(52) U.S. Cl. ........................................ 406/46; 406/197

(58) Field of Classification Search .................. 406/46, 406/93, 94, 95, 102, 197, 198
See application file for complete search history.

(56) References Cited

U.S. PATENT DOCUMENTS 1,849,945 A * 3/1932 Mobley et al. .............. 239/143
2,194,487 A * 3/1940 Thompson .................. 406/129
2,235,542 A * 3/1941 Wenzel ...................... 52/404.1
2,291,871 A * 8/1942 Bokum et al. .............. 406/102
2,664,376 A 12/1953 Philipps
2,721,767 A * 10/1955 Kropp ........................ 406/101
2,929,436 A * 3/1960 Hampshire .................. 264/121
3,012,732 A * 12/1961 Kempthorne ............... 239/300
3,073,652 A * 1/1963 Reichl ........................ 110/347
3,085,834 A * 4/1963 Woten et al. .................. 406/53
3,219,392 A * 11/1965 Gerber ........................ 406/36
3,291,536 A * 12/1966 Smoot ......................... 406/14
3,314,732 A * 4/1967 Hagan ......................... 406/34
3,606,154 A * 9/1971 Tufts ............................ 239/8
3,876,259 A * 4/1975 Gunderson ................... 406/93
3,907,170 A * 9/1975 Schedrin et al. ............... 406/47
3,995,775 A * 12/1976 Birkmeier et al. ............. 406/96
4,019,783 A * 4/1977 Kayser ....................... 406/144
4,129,338 A * 12/1978 Mudgett ..................... 406/135
4,134,242 A 1/1979 Musz et al.
4,199,281 A 4/1980 Wolf
4,203,155 A 5/1980 Garst
4,225,086 A * 9/1980 Sandell ....................... 239/428
4,239,397 A * 12/1980 Sandell et al. ................. 366/3
4,249,839 A * 2/1981 Vance ........................ 406/109
4,272,935 A 6/1981 Lukas et al.
4,294,277 A * 10/1981 Szeliga .................. 137/101.19
4,298,229 A * 11/1981 D'Alli ........................... 299/7
4,309,269 A * 1/1982 Denker et al. ............... 208/419

(Continued)

*Primary Examiner*—Gene Crawford
*Assistant Examiner*—William R Harp
(74) *Attorney, Agent, or Firm*—Robert D. Touslee

(57) ABSTRACT

A system for forming an insulation particle/air suspension suitable for use in a process for forming an insulation product is provided, comprising: a blowing machine for forming an insulation particle/air suspension, wherein the blowing machine comprises at least one outlet; a first hose in communication with the outlet, for transporting at least the suspension from the blowing machine; and a booster fan in communication with the first hose, wherein the booster fan is located downstream from the blowing machine.

22 Claims, 4 Drawing Sheets

U.S. PATENT DOCUMENTS 4,411,388 A * 10/1983 Muck ...................... 239/419.5
4,411,389 A * 10/1983 Harrison .................. 239/427.5
4,487,365 A 12/1984 Sperber
4,542,040 A * 9/1985 Nowak ....................... 427/196
4,547,403 A * 10/1985 Smith ......................... 427/196
4,648,920 A 3/1987 Sperber
4,673,594 A 6/1987 Smith
4,710,480 A 12/1987 Buschmann et al.
4,773,960 A 9/1988 Vincelli et al.
4,804,563 A * 2/1989 Hillemeier et al. ....... 427/397.7
4,804,695 A 2/1989 Horton
4,923,121 A 5/1990 Boyer
4,993,884 A * 2/1991 Mueller et al. ................ 406/49
5,114,281 A 5/1992 Hartnett et al.
5,131,590 A 7/1992 Sperber
5,209,608 A 5/1993 Edwards
5,224,654 A * 7/1993 von Eckardstein ....... 239/427.5
5,421,922 A * 6/1995 Sperber ....................... 156/71
5,507,869 A * 4/1996 Nyberg et al. ............... 118/308
5,511,730 A * 4/1996 Miller et al. .................. 241/57
5,641,368 A 6/1997 Romes et al.
5,657,704 A * 8/1997 Schueler ..................... 110/106
5,666,780 A 9/1997 Romes et al.
5,669,740 A 9/1997 Twonsend et al.
5,921,055 A 7/1999 Romes et al.
5,947,646 A * 9/1999 Lytle ........................... 406/48
5,952,418 A 9/1999 Romes et al.
5,984,590 A * 11/1999 Church et al. ................. 406/48
6,012,263 A 1/2000 Church et al.
6,045,298 A * 4/2000 Lytle ........................... 406/48
6,262,164 B1 7/2001 Church et al.
6,491,479 B1 * 12/2002 Rexius ........................ 406/39
6,796,748 B1 * 9/2004 Sperber ...................... 406/123
7,125,204 B2 * 10/2006 Wysong ....................... 406/38
7,300,521 B2 * 11/2007 Bowman et al. ............ 118/308

* cited by examiner

SYSTEM AND METHOD FOR FORMING AN INSULATION PARTICLE/AIR SUSPENSION

CROSS-REFERENCE TO RELATED APPLICATION

This application is a continuation of International Application No. PCT/US2005/008813, filed Mar. 16, 2005, which in turn claims the benefit of priority of U.S. Provisional Application No. 60/554,176, filed Mar. 18, 2004, the entire contents of which are incorporated by reference herein.

BACKGROUND

A blown-in insulation product can be formed by blowing a loose-fill fibrous insulation at a surface on which the insulation product is to be formed. During use of a conventional system for forming the blown-in insulation product, a significant amount of the insulation material provided from such system typically does not adhere to the surface on which the insulation product is to be formed and/or the installed insulation material. This can result in the accumulation of uninstalled insulation material at the worksite during the installation process, for example, material that has rebounded from the surface to be insulated. In addition, the efficiency of the installation process, the consistency of the installed insulation product and/or the properties of the installed insulation product can be adversely affected by the significant amount of the insulation material not adhering to the surface to be insulated.

SUMMARY

According to one aspect, a system for forming an insulation particle/air suspension suitable for use in a process for forming an insulation product is provided, comprising:

a blowing machine for forming an insulation particle/air suspension, wherein the blowing machine comprises at least one outlet;

a first hose in communication with the outlet, for transporting at least the suspension from the blowing machine; and a booster fan in communication with the first hose, wherein the booster fan is located downstream from the blowing machine.

According to another aspect, a system for forming an insulation particle/air suspension suitable for use in a process for forming an insulation product is provided, comprising:

a blowing machine for forming a first flow of an insulation particle/air suspension, wherein the blowing machine comprises at least one outlet;

a first hose in communication with the outlet, for transporting at least the first flow of an insulation particle/air suspension from the blowing machine; and a booster fan connected to introduce a flow of air and/or a second flow of an insulation particle/air suspension to the first flow of an insulation particle/air suspension, at a point downstream from the outlet of the blowing machine.

According to a further aspect, a method of forming an insulation particle/air suspension suitable for use in a process for forming an insulation product, comprising:

forming a first flow of an insulation particle/air suspension, wherein the first flow is provided from an outlet of a blowing machine, and introducing a flow of air and/or a second flow of an insulation particle/air suspension to the first flow of an insulation particle/air suspension, at a point downstream from the outlet of the blowing machine.

DETAILED DESCRIPTION

Figure 1:
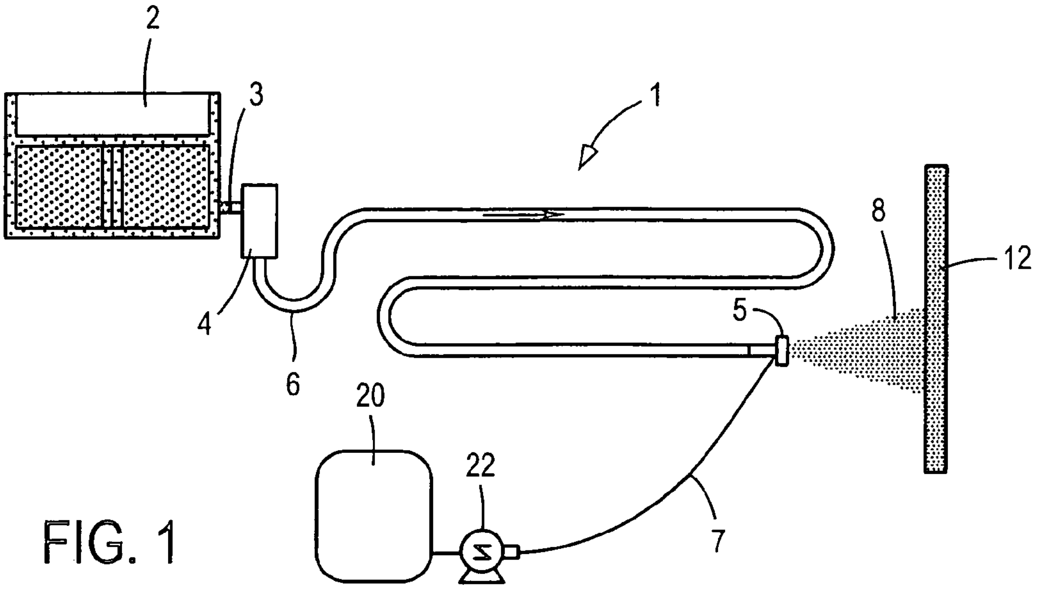
FIG. 1 is a schematic view of an exemplary embodiment of a system for forming an insulation particle/air suspension.

The system and method can be used to form an insulation particle/air suspension which is suitable for use in a process for forming an insulation product. The suspension can be used to form an insulation product on or above any suitable surface such as, for example, a surface of a cavity such as a wall cavity, floor cavity and/or attic cavity. The system and method can be used to form an insulation product in, for example, residential and/or commercial building structures.

For example, the system and method can, for example, provide a flow of an insulation particle/air suspension having an increased velocity and/or mass flow rate. The increased velocity and/or mass flow rate of the suspension flow can in turn, for example, improve adherence of the insulation particles to a surface and/or to other insulation particles, and reduce the amount of insulation particles which rebound from the surface. By reducing the occurrence of rebound, for example, the rate of installation of the blown-in insulation product can be increased and/or the consistency and/or properties of the installed insulation product can be improved.

A blowing machine can be used to form the insulation particle/air suspension and create a flow of the suspension. For example, the blowing machine can receive insulation particles and suspend such particles in air to generate the insulation particle/air suspension. As used herein, the term “insulation particle/air suspension” refers to a suspension of insulation particles in air. The blowing machine can include one outlet or multiple outlets from which a flow or multiple flows of the suspension is provided from the machine. A blowing machine that is suitable for blowing loose-fill insulation can be used. For example, an exemplary insulation, blowing machine is available from Unisul located in Winter Haven, Fla., under the trademark Volu-Matic® III.

The insulation particles can be formed from a material that is effective to provide, for example, thermal and or acoustical insulation. In addition, the insulation particles can be formed from a material that is capable of being suspended in air. The insulation particles can be formed from an inorganic fibrous material such as, for example, fiberglass, slag wool, mineral wool, rock wool, ceramic fibers, carbon fibers, composite fibers and mixtures thereof. Preferably, the insulation particles can be formed from at least fiberglass. Additionally or alternatively, the insulation particles can be formed from cellulose particles.

The fibers from which the insulation particles can be formed can have any dimensions suitable for contributing to an insulation property. For example, the average diameter of the fibers can be about 2 microns or less. The insulation particles can also contain various additives used to improve characteristics thereof and/or to assist in processing the particles.

The size and dimensions of the insulation particles are not particularly limited. For example, the size and dimensions of the insulation particles can enable such particles to be suitable for forming an insulation product, and suspended in air by the blowing machine. For example, the insulation particles can have an average diameter of one-half inch or less. The insulation particles can have varying or substantially uniform sizes and dimensions.

For example, the insulation particles can be in the form of fibrous nodules bound together with a binder. The fibrous nodules can have any shape such as a generally random shape, and can be generally spherical in shape having one or more radii. The fibrous nodules can be relatively small in size, and preferably the nodules can be smaller in size than relatively large-sized clumps of insulation material used in conventional systems. As a result of using relatively small-sized nodules, the nodules can be greater in number than the relatively large-sized clumps used in conventional systems. For example, the maximum dimension of the fibrous nodules can be about three-quarters (¾) inch, preferably about one-half (½) inch, more preferably about one-quarter (¼) inch. As used herein, the term "maximum dimension" of a nodule refers to the longest of the width, length, thickness or diameter of such nodule. The nodular fibrous insulation can also contain, in addition to the fibrous nodules, particles that are larger than such fibrous nodules.

The size of the nodules can depend on, for example, the thermal insulation performance desired, the desired R-value and density of the installed insulation, the size and shape of the volume to be insulated, and/or the relevant building code requirements. In an exemplary embodiment, the maximum dimension of a majority of the nodules, preferably at least about 70%, more preferably at least about 80%, and most preferably at least about 90%, can be about one-half inch. In a preferred embodiment, the maximum dimension of a majority of the nodules, preferably at least about 70%, more preferably at least about 80%, and most preferably at least about 90%, can be about one-quarter inch.

The dimensions of the nodules can be measured by any suitable technique such as, for example, using a plurality of stacked screen sieves containing various screen mesh sizes to segregate the nodules; spreading out a sampling of the nodules on a horizontal flat surface and physically measuring each nodule within the sample with a tape measure; using various air flow resistance methods to correlate nodule size with air flow resistance readings; and/or using sonic energy measurements through samples to correlate sound energy with nodule size.

The system can include at least one hose which is in communication with the outlet of the blowing machine for conveying the suspension flow. For example, at least one hose can be used to convey the suspension flow to a location where a surface to be insulated is present. The at least one hose can have any dimensions suitable for conveying an insulation particle suspension. For example, the length of the at least one hose can depend on the particular application, and can be from about 25 to about 300 feet, more preferably about 50 to about 200 feet. The average inner diameter of the at least hose can depend on the particular application and/or the size of insulation particles being conveyed, and can be at least about 2 inches, preferably from about 3 to about 6 inches, more preferably about 3.5 to about 5 inches, more preferably about 3.5 to about 4 inches. The at least one hose can have a substantially smooth inner surface and/or an inner surface having protrusions formed from corrugations, ribs or a spiraled structure. The at least one hose can have any suitable cross-sectional profile, for example, an elliptical, circular or polygonal cross-sectional profile.

The at least one hose can be formed from any material suitable for conveying the suspension flow. For example, the at least one hose can be formed from a flexible material which can facilitate positioning the hose and directing the suspension flow. Exemplary flexible hoses that can be used in the system are available from The Flexaust® Company, Inc, located in Warsaw, Ind., under the trade name Flexadux® R-2 or Flexadux® R-7.

One end of the hose can be connected to receive a flow of the suspension, and another end of the hose can function as an outlet. If the suspension flows out of the system via the hose, the hose can have a nozzle at the outlet end through which the flow of the suspension is ejected. One or more handles can be arranged at or near the nozzle to assist an operator in directing the flow of the suspension at the surface to be insulated.

One or more jet spray nozzles, and preferably two or more jet spray nozzles can be arranged for applying water or a liquid binder to the insulation particles. The water or liquid binder can be applied onto the insulation particles during or after such particles are ejected from the nozzle. Preferably, the water or liquid binder can be applied onto the insulation particles before the array becomes substantially dispersed. Use of such water or liquid binder can increase the adherence of the insulation particles to each other and/or the surface to be insulated, and can result in the formation of a more stable insulation product. The water or liquid binder can be provided from any suitable source such as, for example, an adjustable volume liquid pump. Exemplary methods, devices and materials in connection with the use of a nozzle for applying water or liquid binder to insulation particles are described in, for example, U.S. Pat. Nos. 5,641,368, 5,921,055 and 4,187,983.

The system can include a booster fan, for example, that can be connected to increase the velocity and/or mass flow rate of the flow of the suspension flowing opt of the system. For example, the booster fan can be connected to provide a flow of air or a second flow of an insulation particle/air suspension, to the first flow of the insulation particle/air suspension. The booster fan can be used in conjunction with at least one hose as described above, to convey the flow of air or the Insulation particle/air suspension. For example, the booster fan can be connected to receive a flow of insulation particle/air suspension from a second outlet of the blowing machine, or separate blowing machine. Any device suitable for providing a flow of air can be used as the booster fan such as, for example, a centrifugal fan. Exemplary centrifugal fans include a Versa-Vac Model 11, insulation removal machine, available from the W. M. Meyer® & Sons Company of Skokie, Ill., or a Krendl 13HP gas-powered' vacuum model available from the Krendl Machine Company of Delphos, Ohio.

While not wishing to be bound by any particular theory, it is believed that a relatively low velocity and/or mass flow rate of the suspension flow can contribute to the occurrence of rebound of the insulation particles. Use of the booster fan of the system can be effective to increase the velocity and/or mass flow rate of the suspension, for example, in comparison with the system without the booster system. Such increased velocity and/or mass flow rate of the suspension can in turn be effective to reduce the amount of rebound of the insulation particles during installation, thereby enabling an increase of the rate of installation of the insulation particles and improving the efficiency of the installation process.

The mass flow rate of the insulation particle/air suspension ejected from the nozzle is not particularly limited and can at least depend on the particular application, the particular equipment used, and/or the characteristics of the materials employed. For example, the mass flow rate can be from about 15 lbs/min to about 35 lbs/min, preferably from about 20 lbs/min to about 30 lbs/min.

The booster fan can be connected in the system in a manner, for example, which enables the booster fan to provide an additional flow of air or insulation particle/air suspension to the flow of insulation particle/air suspension provided from the outlet of the blowing machine. Preferably, the booster fan can be connected in a manner which facilitates increasing the velocity and/or flow rate of the flow of the suspension provided from the outlet of the blowing machine.

Referring to FIG. 1, an exemplary system 1 for forming an insulation particle/air suspension is shown. A blowing machine 2 can be connected to receive insulation particles. The blowing machine 2 suspends the insulation particles in air and blows the suspension from an outlet 3. A booster fan 4 can be connected to directly receive a flow of the suspension from the outlet 3 of the blowing machine 2. A hose 6 can be connected to receive the flow of the suspension from the booster fan 4, and convey such flow proximate to the surface 12 to be insulated, such as a surface of a wall cavity. The suspension 8 can be directed at the surface 12.

The suspension 8 can be ejected from the hose 6 via a nozzle 5 connected to the end of the hose 6. Water or an aqueous binder can be applied to the insulation particles of the suspension 8 by at least one spray tip arranged at the nozzle 5. The water or aqueous binder can be supplied from a source 20 using a pressure line 7 and a pump 22.

Figure 2:
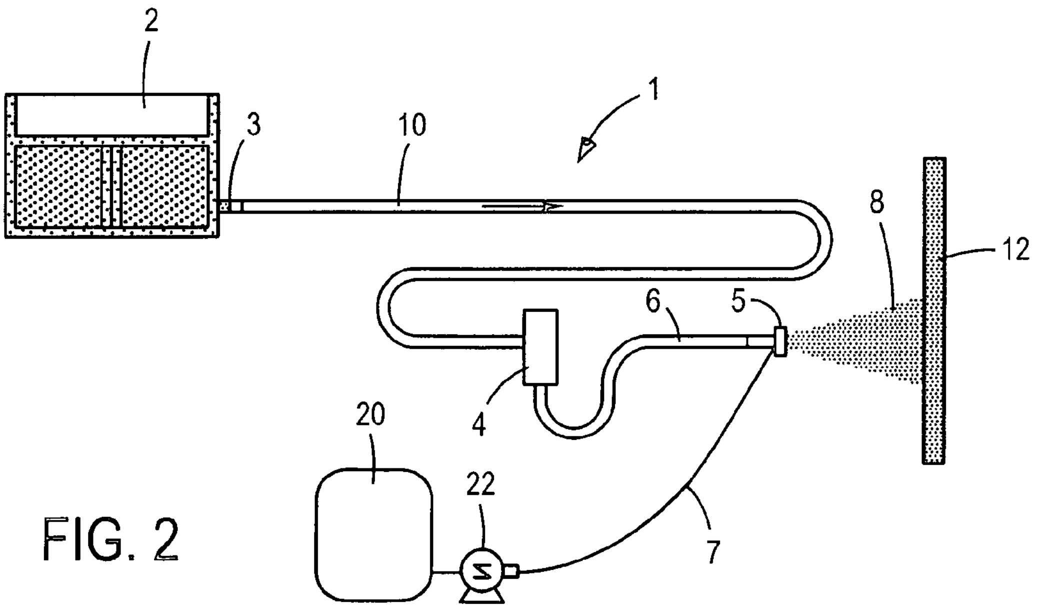
FIG. 2 is a schematic view of another exemplary embodiment of a system for forming an insulation particle/air suspension.

Referring to FIG. 2, another exemplary system 1 for forming an insulation particle/air suspension is shown. In this embodiment, a first hose 10 can be connected to receive the flow of the insulation particle suspension from the outlet 3 of the blowing machine 2, and connected to convey such flow to the booster fan 4. A second hose 6 can be connected to receive the flow from the booster fan 4, and connected to convey such flow to a location where a surface 12 to be insulated is present. The suspension 8 can be ejected in the manner and using the equipment described above with respect to the first exemplary embodiment.

The first hose 10 can be any suitable length, and in an exemplary embodiment, can be relatively short to enable the booster fan 4 to be placed near the blowing machine 2. For example, in the case of a mobile system, using a relatively short first hose 10 can enable the blowing machine 2 and booster fan 4 to be located on a vehicle such as a truck. Alternatively, the first hose 10 can be relatively long, for example, enabling the booster fan 4 to be placed near or at the location where the surface to be insulated is present.

In a third exemplary embodiment, a connector can be employed to combine a flow from the blowing machine with a flow from the booster fan. The connector can include any structure which enables the flows from the blowing machine and the booster fan to be combined into a single flow. The connector can have at least two inlets for receiving flows from the blowing machine and booster fan, respectively, and an outlet for conveying the combined flow. The connector can be directly connected to the blowing machine, or a hose can be employed between the connector and the blowing machine. In addition, the connector can be directly connected to the booster fan, or a hose can be employed between the connector and the booster fan. The connector can have a structure which reduces or prevents clogging of the connector due to the insulation particles.

For example, the connector can be a Y-shaped connector comprising a first arm that is in communication with the blowing machine, a second arm that is in communication with the booster fan, and a leg for conveying a combined flow. As used herein, the term “Y-shaped” refers to a shape in which the first and second arms converge into a single leg, and wherein the first and second arms are symmetrical or asymmetrical. For example, the first arm, second arm and leg can each independently have an inner diameter of from about 2 to about 6 inches. In an exemplary embodiment, at least one of the hollow arms can include a section wherein the cross-sectional area decreases in the direction of flow, for example, the diameter decreases in the direction of flow.

While not wishing to be bound to any particular theory, it is believed that the structure of the at least one hollow arm can, for example, improve flow through the connector. For example, it is believed that the reduced cross-sectional area or diameter at the outlet of the hollow arm can cause the velocity of the flow to increase which in turn can create a negative pressure zone around the perimeter of the outlet of the hollow arm. The negative pressure zone can create a vacuum effect which can allow air at a lower pressure than the pressure in the hose, to be pulled in without creating a back-pressure imbalance.

Figure 3:
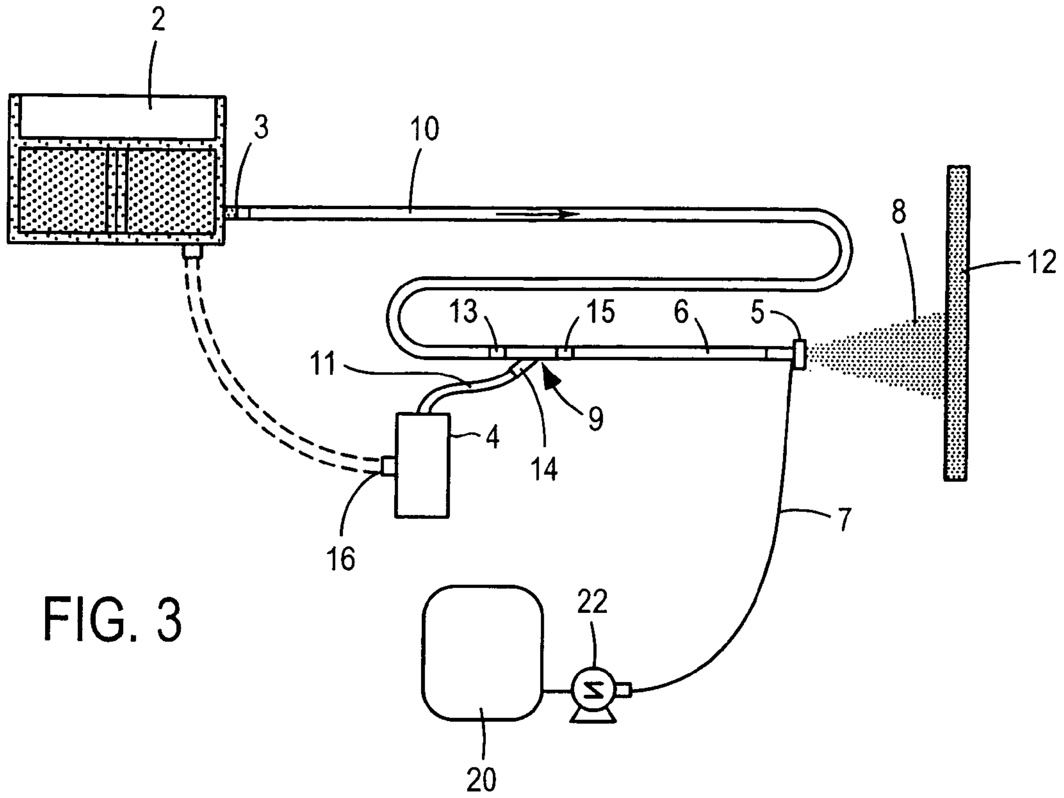
FIG. 3 is a schematic view of another exemplary embodiment of a system for forming an insulation particle/air suspension.

For example, referring to FIG. 3, a first hose 10 can be connected to receive the flow of the suspension from the outlet 3 of the blowing machine 2. The first hose can be connected to convey such flow to a first inlet 13 of a connector 9. The booster fan 4 can be connected to provide a flow of air or a second flow of the suspension to a second inlet 14 of the connector 9, for example, via a second hose 11. For example, when the booster fan 4 provides a flow of air, the inlet 16 of the booster fan 4 can be left unconnected, thereby enabling air to be drawn into the fan 4. Alternatively, when the booster fan 4 provides a flow of suspension, the inlet 16 can be connected to the blowing machine 2 or a second blowing machine (not shown). A third hose 6 can be connected to an outlet 15 of the connector 9 to receive the combined flow. The third hose 6 can be connected to convey the resulting flow to a location where a surface 12 to be insulated is present. The suspension 8 can be ejected in the manner and using the equipment described above with respect to the first embodiment.

In an exemplary embodiment, the connector 9 can include first and second hollow arms for connection with the first and second hoses, respectively, and a hollow leg for connection with a third hose. The first and second arms and leg can have any suitable cross-sectional profile, for example a circular, oval, square, rectangular or other polygonal cross-sectional profile. The angles between the first arm and second arm, the second arm and the leg, and the leg and the first arm, can be any suitable angles for enabling the flows in the first and second arms to be combined into a single flow.

Figure 4C:
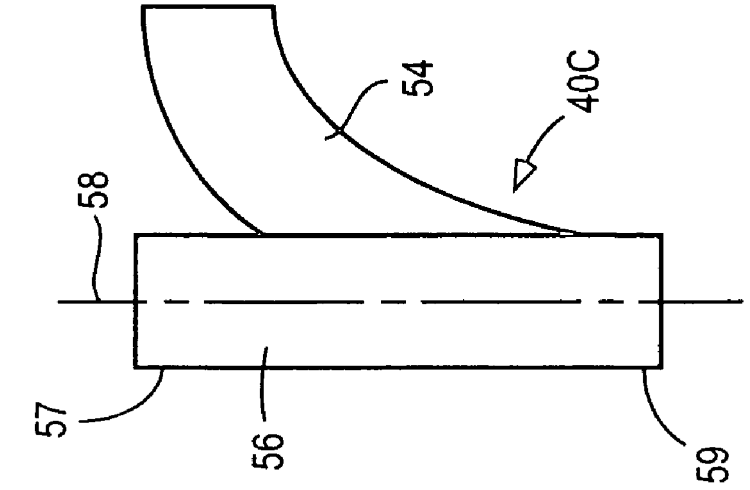
FIGS. 4A to 4C each is a schematic view of an exemplary connector which can be used in a system for forming an insulation particle/air suspension.
Figure 4B:
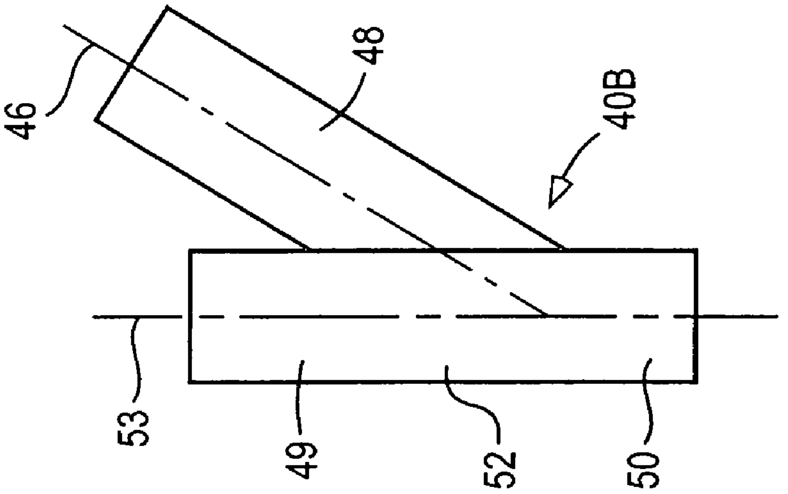
Figure 4A:
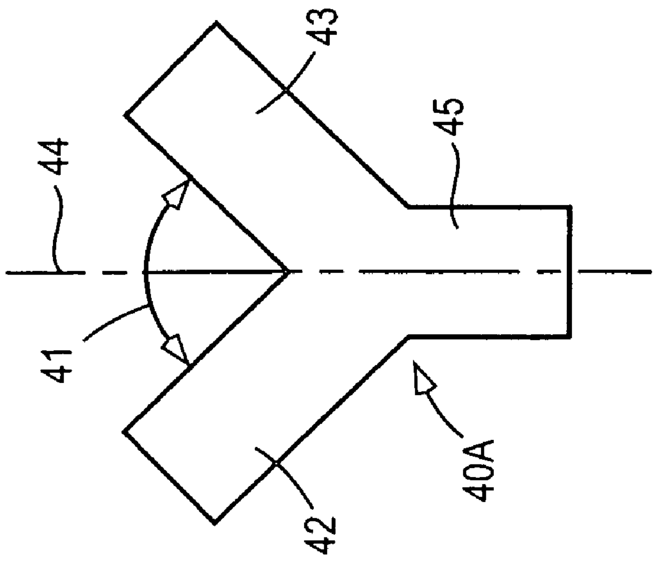

Referring to FIGS. 4A to 4C, exemplary configurations of the Y-shaped connector are shown. Referring to FIG. 4A, the connector 40A can have a symmetrical configuration in which the included angle 41 between the first and second arms 42 and 43 is divided into two equal angles by a centerline 44 of leg 45. The connector 40A can have an included angle 41 of, for example, about 45 to 90 degrees.

Alternatively, referring to FIG. 4B, the Y-shaped connector 40B can have a asymmetrical configuration. An arm 48 can intersect a hollow member 52 comprising an arm portion 49 and a leg portion 50. The centerline 53 of the hollow member can be straight, slightly curved or slightly angled. A centerline 46 of the arm 48 can intersect the centerline 53 of the hollow member 52 to form an included angle, for example, about 90 degrees or less, preferably about 66 degrees or less, more preferably about 60 degrees or less, more preferably about 45 degrees or less, and most preferably about 33 degrees or less.

Referring to FIG. 4C, the Y-shaped connector 40C can be formed from a curved member 54 such as a pipe or elbow. The curved member 54 can intersect a hollow member 56 having an arm portion 57 and a leg portion 59. The hollow member 56 can have a centerline 58, and the hollow member 56 can intersect the curved member 54 at a downstream portion of the curved member 54.

Figure 5A:
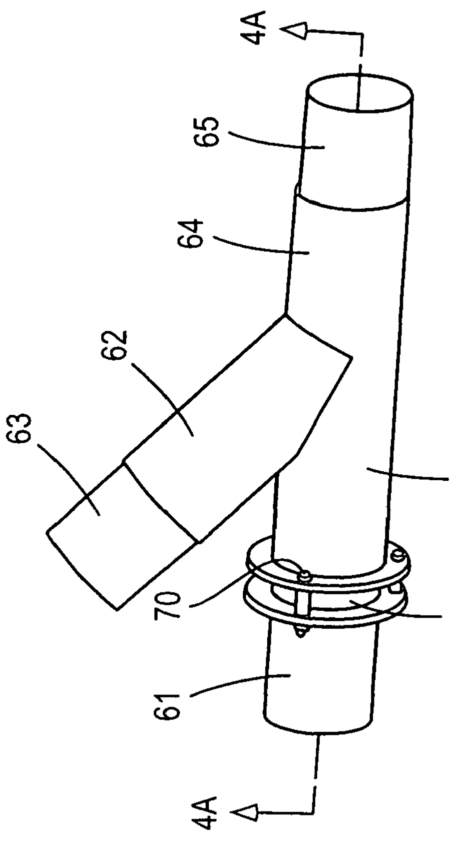
FIG. 5A is a perspective view of an exemplary connector which can be used in a system for forming an insulation particle/air suspension.
Figure 5B:
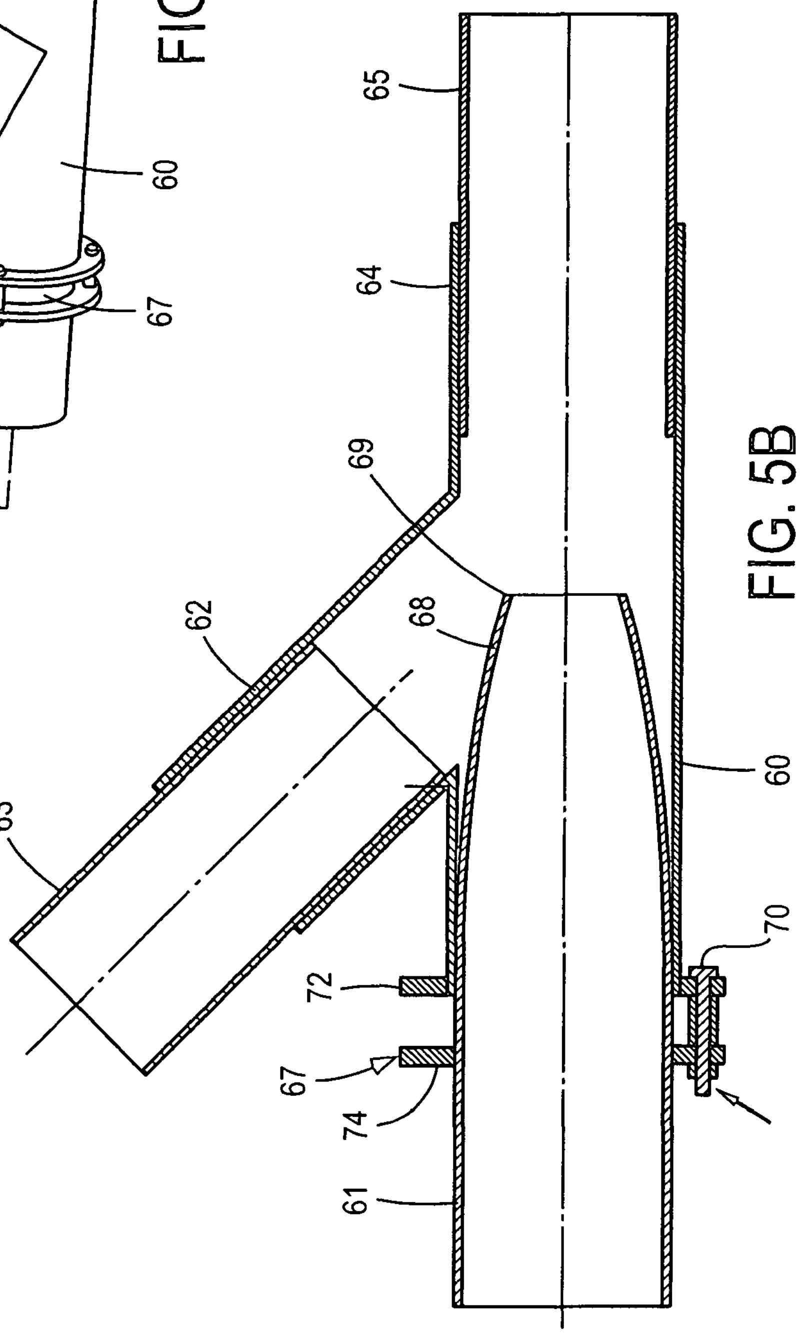
FIG. 5B is a cross-sectional view of an exemplary connector which can be used in a system for forming an insulation particle/air suspension.

Referring to FIGS. 5A and 5B, an additional exemplary embodiment of the Y-shaped connector is shown, wherein such embodiment can function as, for example, an eductor with an aspirator. The connector can include a main inlet arm 60 and a combination connection sleeve and aspirator tube 61, for conveying a flow from a first hose. A second inlet arm 62 and a connection sleeve 63 for the second inlet arm 62, can be used to convey a flow from a second hose. An outlet leg 64 and a connection sleeve 65 for the outlet leg 64, can be used to convey a flow to a third hose.

The aspirator tube 61 can extend inside the main inlet arm 60 and taper in a tapered section 68 to an outlet 69 having a reduced diameter. The inner diameter of the aspirator tube 61 can depend on the diameter of the hose. For example, in an exemplary embodiment, the inner diameter of the aspirator tube 61 can be about 4 inches and the diameter of the outlet 69 can be about 2 inches. The outlet 69 can have a smaller diameter than the inner diameter of the non-tapered section of the aspirator tube 61, for example, about 25% to about 75% percent of the inner diameter of the non-tapered section of the aspirator tube 61. The tube 61 can be positioned such that the outlet 69 is positioned in or near the path of the flow of air or insulation particle/air suspension flowing from the second arm 62. The main flow of suspension flowing through the aspirator tube 61 can expand when it exits from the smaller diameter outlet 69, thereby creating a low pressure region which can assist the entry of the flow from the second arm 62. The second arm 62 can intersect the main arm 60 at any suitable angle such as about 45 degrees or less. While the aspirator tube 61 is shown as being in the main inlet arm 60, such aspirator tube 61 additionally or alternatively can be employed in the second inlet arm 62.

The connector can include an adjusting mechanism 67 that is capable of repositioning the aspirator tube 61 along the length of the main inlet leg 60, so as to reposition the outlet 69 with respect to the flow from the second arm 62. This can enable the connector to be adjusted and fine-tuned according to different operating conditions. For example, bolts 70 can pass through larger holes in a flange 72 that is attached to the main inlet arm 60 and thread into threaded holes in a second flange 74 that is attached to the aspirator tube 61. By turning the bolts 70 one way or the other, the aspirator tube 61 can be moved either further into or out from the main inlet arm 60.

The system can be a mobile system, for example, the system can be stored in and transported by a vehicle. This can enable the system to be transported between worksites. For example, the blowing machine and/or the booster fan can be located onboard and transported by a vehicle such as a truck. During operation of the system, the blowing machine and/or the booster fan can remain onboard the vehicle, or the blowing machine and/or the booster fan can be removed from the vehicle and positioned closer to the worksite.

A method of forming an insulation particle/air suspension is also provided, and the system described above can be used in such method. For example, a first flow of an insulation particle/air suspension can be formed by a blowing machine, wherein the first flow is provided from an outlet of the blowing machine. A flow of air or a second flow of an insulation particle/air suspension can be introduced to the first suspension flow, for example, at a point downstream from the outlet of the blowing machine. This can be accomplished by, for example, employing aspects of the system described above. The introduction of the flow of air and/or the second suspension flow can, for example, result in a combined flow having an increased velocity and/or the mass flow rate.

While a detailed description of specific exemplary embodiments has been provided, it will be apparent to one of ordinary skill in the art that various changes and modification can be made, and equivalents employed without departing from the scope of the claims.

The invention claimed is:

1. A system for forming an air suspension flow of insulation particles suitable for use in a process for forming an insulation product, comprising:

a blowing machine for forming and blowing an insulation particle/air suspension through at least one outlet;

at least one hose having an inner diameter in the range of about 2 inches to about 6 inches, for transporting the air suspension of insulation particles;

a nozzle attached to an outlet end of the at least one hose and one or more spray nozzles for spraying a liquid binder onto the insulation particles, and a centrifugal booster fan in communication with the blowing machine, wherein the centrifugal booster fan is located downstream from the blowing machine, but upstream of the nozzle and the one or more spray nozzles and is connected to receive the air suspension flow of insulation particles into the input of the centrifugal fan to increase the velocity of the air suspension flow of insulation particles downstream of the booster fan, compared with the velocity of the air suspension flow of insulation particles received by the centrifugal booster fan and to increase the velocity of the air suspension flow of insulation particles through the nozzle to reduce the rebound of insulation particles and to produce a more consistent blown-in insulation product having improved properties, the centrifugal booster fan having an outlet that communicates downstream with the nozzle.

2. The system of claim 1, wherein the centrifugal booster fan is located upstream from the hose.

3. The system of claim 1, wherein the centrifugal booster fan is directly connected to the outlet of the blowing machine.

4. The system of claim 1, wherein the system comprises at least two hoses and the centrifugal booster fan is located downstream from a first hose and upstream from a second hose.

5. The system of claim 1, further comprising a connector having an inner diameter in the range of about 2 inches to about 6 inches, the connector comprising a first inlet in communication with the blowing machine, a second inlet in communication with the booster fan, and an outlet in communication with the first and second inlets and the nozzle, the outlet being upstream of any location where a liquid is applied to the insulation particles.

6. The system of claim 5, wherein the connector comprises a first hollow arm in communication with the blowing machine, a second hollow arm in communication with the booster fan, and a hollow leg downstream from and in communication with the first and second hollow arms and the nozzle, the outlet being upstream of any location where a liquid is applied to the insulation particles.

7. The system of claim 6, wherein the first hollow arm and/or the second hollow arm comprises a section wherein the cross-sectional area decreases in a direction towards the hollow leg.

8. The system of claim 5, further comprising a second hose located downstream from the centrifugal booster fan and upstream from the connector.

9. The system of claim 8 further comprising a third hose located downstream from the connector, upstream from any location where a liquid is applied to the insulation particles and in communication with the connector outlet.

10. A method of forming an air suspension of insulation particles suitable for use in a process for forming an insulation product, comprising feeding insulation material into a blowing machine, forming and transporting an air suspension of insulation particles through at least one hose having an inner diameter in the range of about 2 inches to about 6 inches and also through a centrifugal booster fan located downstream of the blowing machine but upstream of a nozzle and spray nozzles for spraying a liquid onto the insulation particles and connected to receive the air suspension flow of insulation particles to increase the velocity of the air suspension flow of insulation particles downstream of the booster fan, compared with the velocity of the air suspension flow of insulation particles received by the centrifugal booster fan and to increase the velocity of the air suspension flow of insulation particles through the nozzle to reduce the rebound of insulation particles and to produce a more consistent blown-in insulation product having improved properties, and spraying a liquid onto the insulation particles with the spray nozzles and directing the air suspension flow of insulation particles having a liquid on their surfaces onto a building surface to form the insulation product.

11. A system for forming an air suspension of insulation particles suitable for use in a process for forming an insulation product, the system comprising: a blowing machine for forming a first flow of an air suspension of insulation particles wherein the blowing machine comprises at least one outlet; a first hose having an inner diameter in the range of at least about 2 inches and up to about 6 inches for transporting the air suspension of insulation particles; and a centrifugal booster fan, communicating with the first hose, to introduce a flow of air and/or a second flow of an air suspension of insulation particles to the first flow of the air suspension of insulation particles at a point downstream from the outlet of the blowing machine, but upstream of any location where a liquid is applied to the insulation particles and connected to receive the air suspension flow of insulation particles to increase the velocity of the air suspension flow of insulation particles downstream of the booster fan, compared with the velocity of the air suspension flow of insulation particles received by the centrifugal booster fan and to increase the velocity of the air suspension flow of insulation particles through the nozzle to reduce the rebound of insulation particles and to produce a more consistent blown-in insulation product having improved properties.

12. The system of claim 11, wherein the centrifugal booster fan is located upstream from the first hose and downstream from the blowing machine.

13. The system of claim 11, wherein the centrifugal booster fan is directly connected to the outlet of the blowing machine.

14. The system of claim 11, wherein the centrifugal booster fan is located downstream from the first hose and upstream from a second hose, the second hose communicating with a nozzle.

15. The system of claim 11, further comprising a connector having an inner diameter in the range of about 2 inches to about 6 inches, the connector comprising a first inlet in communication with the blowing machine, a second inlet in communication with the centrifugal booster fan, and an outlet in communication with the first and second inlets, the outlet being upstream of any location where a liquid is applied to the insulation particles.

16. The system of claim 15, wherein the connector comprises a first hollow arm in communication with the blowing machine, a second hollow arm in communication with the centrifugal booster fan, and a hollow leg downstream from and in, communication with the first and second hollow arms, the outlet being upstream of any location where a liquid is applied to the insulation particles.

17. The system of claim 16, wherein the first hollow arm and/or the second hollow arm comprises a section wherein the cross-sectional area decreases in a direction towards the hollow leg.

18. The system of claim 15, further comprising a second hose located downstream from the centrifugal booster fan and upstream from the connector.

19. The system of claim 18, further comprising a third hose located downstream from the connector, upstream from any location where a liquid is applied to the insulation particles and in communication with the connector outlet.

20. A method of forming an air suspension of insulation particles suitable for use in a process for forming an insulation product, comprising feeding insulation material into a blowing machine, forming and transporting an air suspension of insulation particles through a centrifugal booster fan and a first hose, the centrifugal booster fan located upstream of a location where a liquid is applied to the insulation particles and connected to receive the air suspension flow of insulation particles to increase the velocity of the air suspension flow of insulation particles downstream of the centrifugal booster fan, compared with the velocity of the air suspension flow of insulation particles received by the centrifugal booster fan and to increase the velocity of the air suspension flow of insulation particles through the nozzle to reduce the rebound of insulation particles and to produce a more consistent blown-in insulation product having improved properties.

21. A method of forming an air suspension of insulation particles suitable for use in a process for forming an insulation product, comprising forming a first air suspension of insulation particles by feeding insulation material into a blowing machine, wherein the first air suspension particles is produced by the blowing machine and exits from one or more outlets of the blowing machine, and introducing a second air suspension of insulation particles coming from a centrifugal booster fan, after having passed from the blowing machine and through the centrifugal booster fan, to the first air suspension of insulation particles at a point downstream from the one or more outlets of the blowing machine and upstream of any location where a liquid is applied to the insulation particles and the centrifugal booster fan connected to receive the air suspension flow of insulation particles to increase the velocity of the air suspension flow of insulation particles downstream of the centrifugal booster fan, compared with the velocity of the air suspension flow of insulation particles received by the centrifugal booster fan and to increase the velocity of the air suspension flow of insulation particles through the nozzle to reduce the rebound of insulation particles and to produce a more consistent blown-in insulation product having improved properties.

22. The method of claim 21, wherein a liquid binder is applied to the insulation particles downstream from the centrifugal booster fan.

* * * * *